Patented Aug. 10, 1954

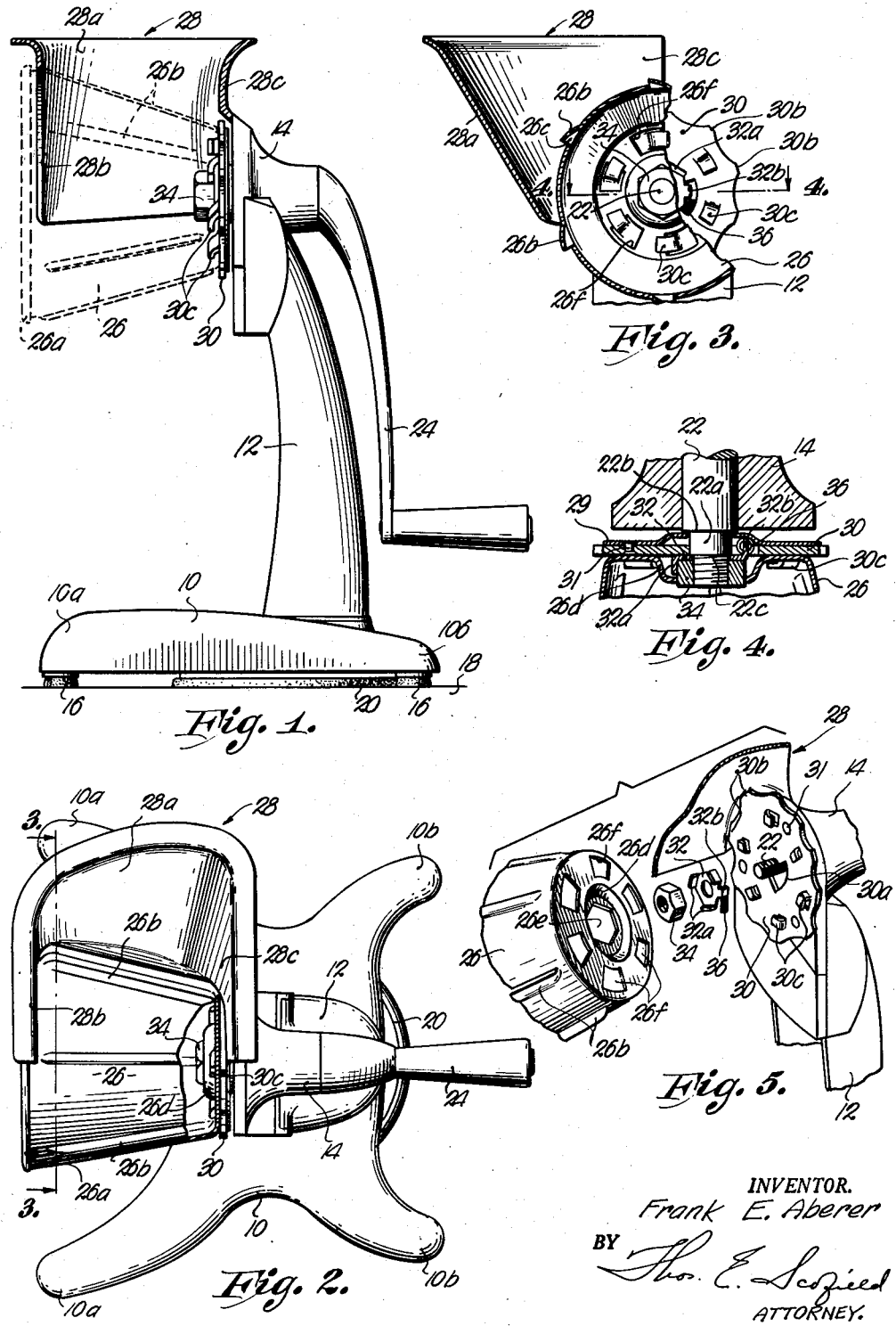

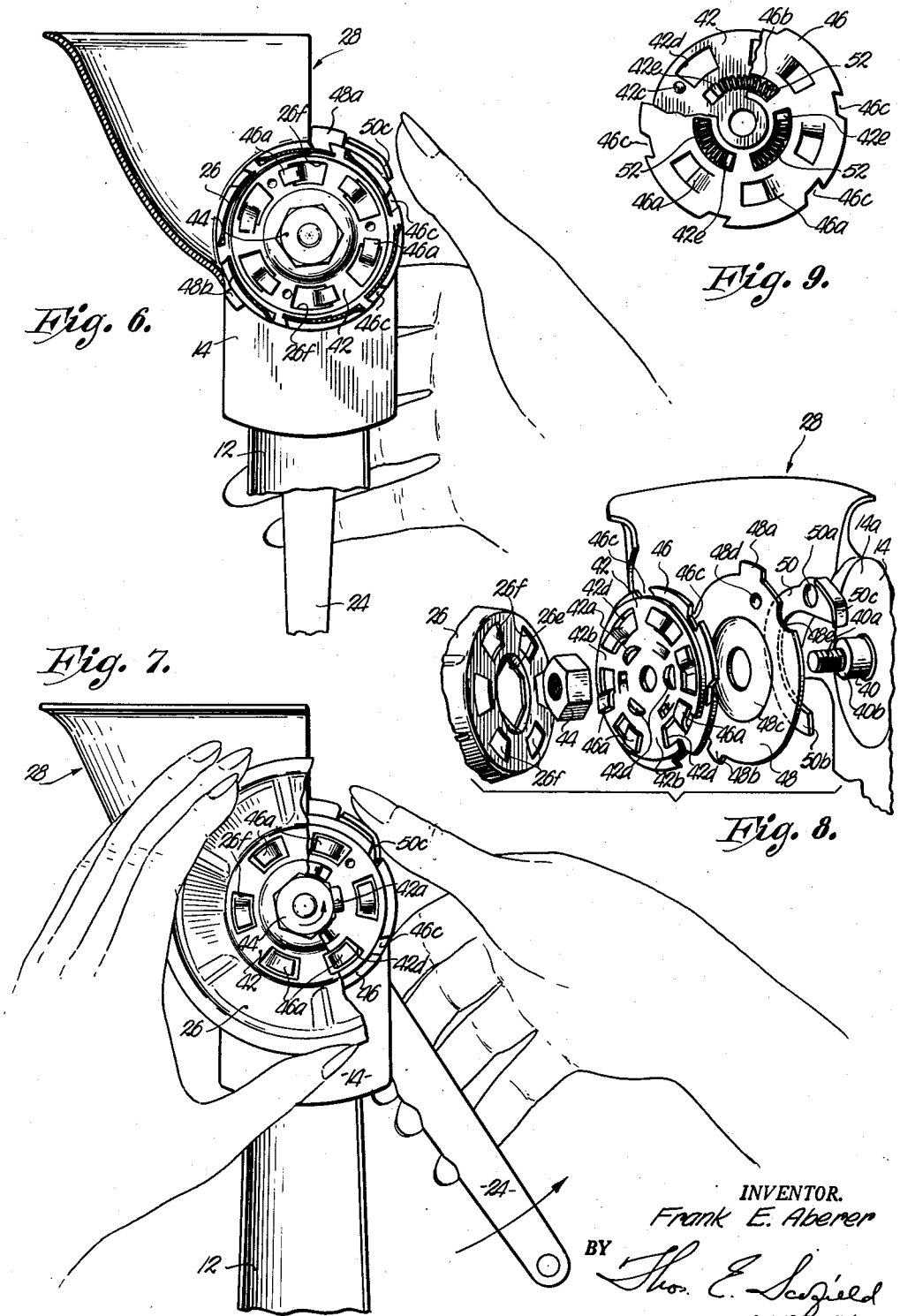

2,685,902

UNITED STATES PATENT OFFICE 2,685,902

KITCHEN SLICING AND SHREDDING MECHANISM AND LATCHING MECHANISM THEREFOR

Frank E. Aberer, Kansas City, Kans., assignor to John C. Hockery, trustee, Kansas City, Kans.

Application April 1, 1954, Serial No. 420,399

7 Claims. (Cl. 146—177)

The present invention relates in general to devices for slicing, shredding or grating foods (e. g., vegetables, fruits and cheese) and like materials; it deals more particularly with slicing or shredding devices that employ rotary cutting elements.

The object of the invention, broadly speaking, is to provide a simple, efficient and durable kitchen utensil of the character indicated, which is convenient and easy to use, effective in its operation, easy to clean and maintain sanitary, rugged in construction and reasonably economical to manufacture.

Another object is to provide a simple and efficient slicing and shredding unit having a rotary cutting element that is readily removable from the driving shaft for purposes of cleaning; said element also being interchangeable with others of generally similar construction.

To the latter end, a further object is to provide an improved latching mechanism by which the aforementioned rotary element or elements may be secured to the drive shaft and removed therefrom at will quickly and easily, which mechanism insures against accidental detachment or slippage of the cutting element when same is latched to the shaft and holds it securely and firmly in operation position.

Other and additional objects, together with the features of novelty by which the objects are achieved, will appear in the course of the following description of the invention.

In the accompanying drawings which form a part of the specification and are to be read in conjunction therewith and in which like reference numerals are employed to indicate like parts of the various views:

Figs. 1 to 5, inclusive, show one form of the invention, and Figs. 6 to 9, inclusive, show a second, preferred form. More specifically:

Fig. 1 is a side elevational view of a food slicer and shredder embodying the invention, the removable cutting element being shown in dotted lines.

Fig. 2 is a plan view of same, part of the cutting element being broken away for purposes of illustration.

Fig. 3 is a cross-sectional view of the upper portion of the device, taken along the line 3—3 of Fig. 2 in the direction of the arrows;

Fig. 4 is an enlarged cross section taken along the line 4—4 of Fig. 3 in the direction of the arrows;

Fig. 5 is an exploded perspective view showing the components of the latching mechanism for the removable cutting element;

Fig. 6 is a cross-sectional view similar to that in Fig. 3 but showing an alternative form of latch mechanism holding the cutting element in place;

Fig. 7 is a fragmentary front elevational view with parts broken away for clarity to illustrate the manner in which the cutting element is removed from my device;

Fig. 8 is an exploded perspective view of the components of the latch mechanism shown in Figs. 6 and 7; and Fig. 9 is a detail of certain of said components, showing same from the side opposite that seen in Fig. 8.

Referring more particularly to Figs. 1 to 5 of the drawings, my food slicer or shredder has a base 10 with an upstanding pedestal 12 carrying a head 14 at its upper end. The base is of irregular shape providing two forwardly extending legs 10a and two rearwardly extending legs 10b as shown in Fig. 2; each of these has at its tip a rubber bushing or foot 16 adapted to rest on the table 18 or other suitable horizontal surface. For the purpose of firmly anchoring the unit to the supporting surface, I prefer to provide it with a suction cup gripping element 20, but this forms no part of the present invention and therefore has not been illustrated in detail.

Journaled in the head 14 is a horizontal shaft 22 having a hand crank 24 secured to one end thereof for manually turning the shaft. As will be explained more in detail presently, a tapered slicing, shredding or grating member 26 is adapted to be connected to the opposite end of the shaft to rotate therewith upon turning of the crank. This member is a hollow truncated cone or cup whose walls converge toward the bottom thereof; in use it is disposed with its axis horizontal so the bottom of the cup is adjacent the head 14, and the rim or mouth 26a opens toward the left as seen in Figs. 1 and 2. Sharpened knife elements 26b are struck out of the wall of the cup forming complementary apertures 26c.

Beside the rotary cup and cooperating with the lateral exterior portion to form an open top hopper (see Figs. 2 and 3) is a stationary chute or guide 28 carried on the head 14. This has an inclined side wall 28a down which vegetables or the like can be fed toward the cup as the latter is rotated; and end walls 28b and 28c which serve to confine the vegetable against movement axially of the cup beyond the ends thereof.

For the purpose of connecting the rotary cup to the shaft to turn therewith, I make use of a latching disk comprising a pair of generally circular plates 29 and 30 secured together by rivets 31. The two plates are centrally apertured and, as shown in Fig. 4, journaled for rotation on a reduced portion 22a of the shaft. As can also be seen in the latter figure, the central portion of the rear plate 29 is dished away from the forward plate, which provides in effect an axially elongated bearing that is effective to stabilize the latching disk unit against wobbling on the shaft. Although free to turn on the shaft, this unit is held against axial movement, being positioned between the shoulder 22b and a washer 32 which in turn is clamped against a second shoulder 22c by a hexagonal nut 34 screwed on the threaded end of the shaft.

Adjacent the central aperture in the forward plate 30, there is a 90° cutout segment which forms with the side of the shaft 22 a circumferentially elongated opening or slot 30a adapted to receive a coiled compression spring 36. The purpose of this spring will be made clear presently, but it may well be noted at this point that the spring is held in the slot by means of the back plate 29, the dished center portion of which covers the rear of the slot; and washer 32 which covers the major portion of the front of the slot.

As best seen in Fig. 5, the washer has three outwardly projecting lugs 32a which engage three corresponding sides of the nut to prevent relative rotation between the two. This likewise serves to prevent relative rotation between the washer and the shaft when the nut is screwed tightly home. The washer also has a lug 32b projecting inwardly and received in the circumferentially elongated slot 30a in the disk 30. The coiled compression spring 36 is disposed in this slot between the lug and one end of the slot whereby it always biases disk 30 clockwise as seen in Fig. 3. The margin of the disk is scalloped to provide suitable finger receiving elements 30b, however, to facilitate limited manual rotation of the disk counterclockwise against the force of the spring.

The bottom or small end of the rotary cup 26 has a central concavo-convex boss 26d containing a hexagonal aperture 26e adapted to receive and closely embrace the sides of nut 34. Arranged in a circle around the boss are a plurality of equally spaced latch openings 26f. A corresponding series of equally spaced latch lugs or ears 30c struck out of the disk 30 are arranged to pass through the openings and, under the influence of spring 36, advance circumferentially to the position shown in Fig. 3. When in this position, it will be seen that the free end of each latch lug overlies a portion of the bottom of the cup adjacent one of the apertures 26f whereby the bottom of the cup is held firmly seated against the face of disk 30. Stated differently, the latch lugs prevent movement of the cup axially away from the disk 30 and, at the same time, the presence of nut 34 in the hexagonal opening 26e prevents rotation of the cup relative to the shaft 22.

The rotary cup thus is firmly supported and also is locked securely to the shaft. In using the device, the cup is turned counterclockwise (as seen in Fig. 3) by means of the hand crank 24. The vegetable or other object to be sliced is pressed downwardly in the space between the exterior of the cup and the sloping wall 28a, causing portions to be shaved off by the cutting elements 26b as the latter travel past the confined vegetable. These shavings or cuttings pass through the apertures 26c to the interior of the cup, and as will be clear from Fig. 1, they then advance toward the open mouth or rim 26a and fall from the cup into a suitable receptacle positioned therebelow. The forward feet 10a of the base are spread apart to permit positioning of a bowl or like receptacle therebetween for this purpose.

It should be observed that upon turning the hand crank 24 to perform the slicing or shredding operation just described, the torque is transmitted from the drive shaft to the tapered cup solely through the hexagonal socket connection which the latter has with the hexagonal nut 34. This direct drive connection between the two by-passes the latching disk 30 and no torque is transmitted through the latch mechanism as such, although disk 30 turns with the cup and keeps the latching lugs 30c engaged so as to support the cup and maintain the aforementioned drive connection between the hexagonal nut and its complementary aperture or socket 26e.

In order to remove cup 26 from the device, it is only necessary to hold crank 24 stationary and manually turn disk 30 very slightly in a counterclockwise direction (Fig. 3) to bring the latch lugs 30c fully within the associated apertures 26f; then the cup can be withdrawn axially from the hexagonal nut. To replace the cup, this procedure is reversed: the cup is advanced axially onto the nut while disk 30 is manually turned counterclockwise against the force of spring 36 so that the lugs 30c will register with and pass through the apertures 26f; then the latching disk is released and spring 36 shifts the lugs 30c into latching position as shown.

Thus, it is very simple to remove the rotary cup for cleaning after it has been used, and equally easy to replace the cup on the unit after cleaning. This feature also makes it a simple matter to substitute for the cup shown another cup of similar construction having identical cutting elements 26b or alternatively, cutting elements of other configuration. Stated differently, it is contemplated that different rotary cups may be mounted interchangeably on the unit by means of the latching mechanism described, the different cups being identical except for the size and shape of the cutting elements 26b struck out of the cup wall.

Referring now to Figs. 6 to 9, the preferred embodiment shown therein is like that already described except as to the construction of the latch mechanism. It will be understood, in other words, that this unit employs the same base (not shown), the same pedestal 12, the same head 14, and the same hopper 28 as used in the previous embodiment; likewise, the construction of the rotary cup 26 is the same and it is turned in the same fashion by hand crank 24, but the arrangement for detachably connecting the latter elements together has been modified, as will now be explained.

Crank 24 is provided with a shaft 40 journaled in the head 14 as before, and this shaft has a threaded end section 40a of reduced diameter to provide a shoulder 40b. A centrally apertured circular disk 42 is seated against this shoulder and clamped tightly to same by a hexagonal nut 44 so that it always turns with the shaft. Three bosses 42a struck out of the disk at intervals of 120° engage the sides of the nut to further insure against relative rotation between the nut and disk.

Between disk 42 and the face 14a of head 14 are a generally circular latch plate 46 and a generally circular detent support plate 48, both slightly larger in diameter than disk 42 and both centrally apertured to be loosely received on the enlarged portion of shaft 40 behind the shoulder 40a. Plate 48 is provided with indexing lugs 48a and 48b which engage against the upper and lower edges of the hopper (see Figs. 6 and 8) to prevent it from turning with the shaft. The margin of plate 46 is notched as shown at 46c for a purpose which will be dealt with more fully hereinafter.

Disk 42 is dimpled by stamping as shown at 42b to provide three small equi-spaced bosses 42c on its back, and in assembled condition the latch plate 46 bears against these bosses so the two plates are substantially in face-to-face bearing relation. Plate 48 in turn bears lightly against the back of plate 46, but its flat marginal portion is spaced away from the face 14a of head 14 due to its central portion 48c being dished inwardly toward face 14a.

In the space thus left between plate 48 and face 14a, a detent 50 is swingably suspended on a pivot 48d extending rearwardly from the plate, the pivot being loosely received in aperture 50a of the detent. The detent is formed with a depending C-shaped leg 50b which serves as a counterweight normally maintaining the exposed end 50c elevated as shown in Fig. 6. The margin of plate 48 is notched at 48e to permit downward movement of said free end under thumb pressure, as will be explained presently in connection with Fig. 7. (It will be understood, of course, that the detent cannot drop off of pivot 48d due to its being loosely confined between the back of plate 48 and the face 14a of the head 14.)

Disk 42 contains a series of six openings 42d which are arranged in a circle around the central aperture and are so positioned with reference to the nut-locating bosses 42a that they always will register with the latch apertures 26f in the cup 26 whenever the hexagonal opening 26e is advanced over nut 44 to seat the bottom of the cup against the exposed face of the disk. Extending through openings 42d are six corresponding latching lugs or ears 46a struck out of the plate 46, these lugs being arranged in a circle. Within the latter circle, as may best be understood from Fig. 9, plate 46 has a series of three arcuate slots 46b arranged in a circle of smaller diameter. Three lugs 42e struck out of disk 42 extend rearwardly into the respective slots.

Within each slot there also is a coiled compression spring 52 having one end bearing against the associated lug 42e and its other end bearing against the opposite end of the slot. Accordingly, the latching plate 46 always is spring-biased clockwise relative to disk 42, as seen in Fig. 9 (or counterclockwise as seen in Fig. 8). Under the influence of this spring pressure, then, the latching lugs 46a which extend through openings 42d normally are advanced circumferentially to the position shown in Figs. 6 and 8; when in this position, it will be apparent that the free end of each latch lug overlies a portion of the disk 42 adjacent one of the apertures 42d.

Likewise, assuming that the cup 26 is seated against disk 42, as shown in Fig. 6, the lug ends also overlie a portion of the cup bottom adjacent one of the apertures 26f whereby they prevent movement of the cup axially away from disk 42. Under this condition, the presence of nut 44 in the hexagonal opening 26e prevents rotation of the cup relative to shaft 40. The cup, in other words, is firmly supported and also locked securely to the shaft to turn therewith.

As has been explained in connection with Figs. 1 to 5, the cup is turned counterclockwise (as seen in Fig. 6) by means of the hand crank 24 in using the device to slice or shred a vegetable or other object positioned in the hopper 28 and pressed against the exterior of the cup. It should again be observed that upon turning the hand crank 24 to perform the slicing or shredding operation, torque is transmitted from the drive shaft 40 to the tapered cup solely through the hexagonal socket connection which the latter has with the hexagonal nut 44. This direct drive connection between the two by-passes the latching disk 46 and no torque is transmitted through the latch mechanism as such, although member 46 turns with the cup and keeps the latching lugs 46a engaged so as to support the cup and maintain the aforementioned drive connection between the hexagonal nut 44 and its complementary aperture or socket 26e.

In order to remove cup 26 from the device, crank 24 is allowed to hang straight down as shown in Fig. 7 and thumb pressure is applied to the free end 50c of the detent, this end being bent over to form a dog which in normal operation of the shredder is raised clear of the circular latch plate 46 but now engages its margin under the influence of the thumb pressure aforementioned. Holding the dog thus depressed, the operator turns crank 24 counterclockwise with the fingers of the same hand, as shown in Fig. 7; on doing this, latch plate 46 initially turns with the hand crank to bring one of its marginal notches 46c into register with the dog, whereupon the dog descends into the notch and holds the latch disk against further rotation as the operator continues to lift the crank handle 24 upwardly a small distance. The latter continued movement turns shaft 40, nut 44, disk 42 and cup 26 counterclockwise as a unit relative to the latching plate 46, shifting the apertures 26f (as shown in Fig. 7) to a position where they are clear of the latching lugs 46a, and the cup now may be withdrawn axially from the hexagonal nut 44, using the left hand as shown in the latter figure.

To replace the cup 26 after it has been washed (or to substitute a different one in its place) the dog or detent 50c is again depressed with the thumb while crank handle 24 is lifted as shown in Fig. 7 in order to bring lugs 46a to their "unlatching" position. In this condition, since plate 42 is shifted counterclockwise relative to plate 46, it will be understood that springs 52 (Fig. 9) are compressed and exert a force tending to restore the members to the position illustrated in Fig. 8, which force is resisted by the upward pressure on crank handle 24. While the parts are so held, the bottom of cup 26 is advanced axially over the hexagonal nut 44 so that it seats against the exposed face of plate 42. Steadying the cup in this position with the left hand, as shown in Fig. 7, the operator now withdraws the right hand from the crank handle 24 and dog 50c. Upon being so released, springs 52 act to turn the plate 42, nut 44 and cup 26 clockwise relative to plate 46 and thus bring the latching lugs 46a back to the position illustrated in Fig. 6 where they overlie portions of the cup bottom adjacent the apertures 26f. The cup, in other words, is now latched securely in place and can be turned by rotation of the crank handle to perform the normal shredding operation.

Dog 50c, it will be understood, is raised clear of the margin of latching plate 46 by means of its counterweight 50b when the thumb pressure is removed therefrom, so does not interfere with normal rotation of the cup in the shredding operation.

From the foregoing it will be seen that this invention is one well adapted to attain all of the ends and objects hereinbefore set forth, together with other advantages which are obvious and which are inherent to the apparatus.

It will be understood that certain features and subcombinations are of utility and may be employed without reference to other features and subcombinations. This is contemplated by and is within the scope of the appended claims.

Inasmuch as various possible embodiments of the invention may be made without departing from the scope thereof, it is to be understood that all matter herein set forth or shown in the accompanying drawings is to be interpreted as illustrative and not in a limiting sense.

Having thus described my invention, I claim:

1. A slicing or the like device for foods comprising a suitable support, a shaft journalled in said support, said shaft having on one end a power applying means for receiving and rotating a slicing or the like device, said means having an eccentric portion, an apertured disk on said shaft adjacent said means and a latch-bearing disk journalled on said shaft and having at least one latch thereon extending through an aperture in said first-mentioned disk for engagement with said slicing or the like device.

2. A slicing or the like device for foods comprising a suitable support, a shaft journalled in said support, a slicing or the like means, said shaft having on one end a power applying means for engaging and rotating said slicing or the like means, one of said means having an eccentric stub and the other having a complementary socket for receiving said stub, an apertured disk on said shaft adjacent said means and a latch-bearing disk journalled on said shaft and having at least one latch thereon extending through an aperture in said first-mentioned disk for engagement with said slicing or the like means.

3. A slicing or the like device for foods comprising a suitable support, a shaft journalled in said support, a slicing or the like means, said shaft having on one end a power applying means for engaging and rotating said slicing or the like means, one of said means having an eccentric stub and the other having a complementary socket for receiving said stub, an apertured disk on said shaft adjacent said means and a latch-bearing disk journalled on said shaft for relative rotation therewith and having at least one latch thereon extending through an aperture in said first-mentioned disk for engagement with said slicing or the like means.

4. A device as in claim 3 having stop means limiting the rotation of said latch-bearing disk relative to said shaft to less than one full revolution.

5. A device as in claim 3 having spring means between said shaft and latch-bearing disk, biasing the latter in a direction to cause engagement of said latch with said slicing or the like means.

6. A device as in claim 3 having detent means on said support normally spaced clear of said latch-bearing disk and being displaceable to engage said latch-bearing disk to restrain the same against rotation relative to said support.

7. A slicing or the like device for foods comprising a suitable support, a shaft journalled in said support, a slicing or the like means, said shaft having on one end thereof a power applying means for engaging and rotating said slicing or the like means, one of said means having an eccentric stub and the other having a complementary socket for receiving said stub, a latch-bearing disk journalled on said shaft for relative rotation therewith and positioned adjacent said means and having at least one latch thereon for engagement with said slicing or the like means for holding the latter into engagement with said power applying means, spring means between said shaft and said latch-bearing disk, biasing the latter in a direction to cause engagement of said latch with said slicing or the like means, and means on said support normally spaced clear of said latch-bearing disk and being displaceable to engage said latch-bearing disk to restrain the same against rotation relative to said support.

References Cited in the file of this patent

UNITED STATES PATENTS

| Number | Name | Date |
|---|---|---|
| 939,951 | Myers et al. | Nov. 9, 1909 |
| 1,444,975 | Maine | Feb. 13, 1923 |
| 1,538,609 | Barnett | May 19, 1925 |
| 2,596,604 | Schaeffer | May 13, 1952 |